(12) United States Patent
Kim (10) Patent No.: US 12,528,335 B2
(45) Date of Patent: Jan. 20, 2026

(54) THERMAL MANAGEMENT SYSTEM FOR VEHICLE

(71) Applicants: Hyundai Motor Company, Seoul (KR); Kia Corporation, Seoul (KR)

(72) Inventor: Jong Won Kim, Cheonan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 211 days.

(21) Appl. No.: 18/540,021

(22) Filed: Dec. 14, 2023

(65) Prior Publication Data

US 2025/0128570 A1 Apr. 24, 2025

(30) Foreign Application Priority Data

Oct. 19, 2023 (KR) .......................... 10-2023-0140232

(51) Int. Cl.
*B60H 1/00* (2006.01)

(52) U.S. Cl.
CPC ................................ *B60H 1/00914* (2013.01)

(58) Field of Classification Search
CPC ............ B60H 1/00914; B60H 1/00921; B60H 1/00885; B60H 1/143; B60H 1/32284; B60H 1/00278; B60H 1/32281; B60H 1/2218; B60H 1/2221; B60H 2001/00928; B60H 2001/00949; B60H 2001/00307
See application file for complete search history.

(56) References Cited

U.S. PATENT DOCUMENTS

| | | | |
|---|---|---|---|
| 5,291,941 A | 3/1994 | Enomoto et al. | |
| 9,212,599 B2* | 12/2015 | Gao | B60L 58/21 |
| 2002/0002841 A1 | 1/2002 | Izawa et al. | |
| 2014/0062228 A1* | 3/2014 | Carpenter | B60K 11/02 310/53 |
| 2020/0031194 A1* | 1/2020 | Lee | B60H 1/00392 |
| 2022/0161630 A1* | 5/2022 | Lindquist | B60L 1/003 |
| 2025/0135843 A1* | 5/2025 | Lee | B60H 1/32 |

FOREIGN PATENT DOCUMENTS

| | | |
|---|---|---|
| JP | 2016205729 A | 12/2016 |
| KR | 100419564 B1 | 2/2004 |
| KR | 20050007078 A | 1/2005 |

\* cited by examiner

*Primary Examiner* — Marc E Norman
(74) *Attorney, Agent, or Firm* — Slater Matsil, LLP (57) ABSTRACT

In an embodiment, a thermal management system for a vehicle includes a refrigerant circuit having a compressor, a condenser, an expansion valve, and an evaporator, all connected via refrigerant lines, so that refrigerant passes and circulates therethrough, a coolant circuit having a water pump, a chiller, a water heater, a heater core, and a battery coolant passage through a coolant line, a bypass line installed to connect a refrigerant line between the compressor and the condenser to a refrigerant line between the expansion valve and the evaporator, a branch line branched from the bypass line and connected to the coolant line of the coolant circuit through the chiller, and a valve device configured to control a flow of the refrigerant so that the refrigerant circulating along the refrigerant line flows by selectively passing through the bypass line, the branch line, and the chiller.

19 Claims, 8 Drawing Sheets

THERMAL MANAGEMENT SYSTEM FOR VEHICLE

CROSS-REFERENCE TO RELATED APPLICATIONS

This application claims the benefit of Korean Patent Application No. 10-2023-0140232, filed on Oct. 19, 2023, which application is hereby incorporated herein by reference.

TECHNICAL FIELD

The present disclosure relates to a thermal management system for a vehicle.

BACKGROUND

Generally, vehicles are equipped with a thermal management system for performing the thermal management of the overall vehicle. The thermal management system manages the energy required for the interior air-conditioning of the vehicle, the cooling of a power electronics (PE) system, and the cooling or heating of a battery.

The thermal management system for a vehicle may be defined as a system in a broad sense including an air-conditioning system and a heat pump system for air-conditioning, and a temperature control system that uses coolant or refrigerant for thermal management such as cooling or heating components of a power system.

Conventional thermal management systems include a compressor, a water cooled condenser (WCC), a chiller, an external condenser (air cooled condenser), an internal heat exchanger (IHX), an expansion valve, and the like.

Here, the IHX includes an inner condenser, an evaporator, an accumulator, and the like. In addition, in the thermal management system, the accumulator, the compressor, the external condenser, the expansion valve, and the evaporator are the main components constituting a general air-conditioning system.

The conventional thermal management system may be operated in a heating mode in which heated air is supplied to a vehicle interior, a cooling mode (air-conditioner mode) in which cooled air is supplied to the vehicle interior, a dehumidification mode in which moisture is removed from the vehicle interior, and the like.

Among them, refrigerant and an electric heater (e.g., a positive temperature coefficient (PTC) heater) may be used when the thermal management system is operated in the heating mode, and when a temperature of the refrigerant is sufficiently high, the interior may be heated by using high-temperature refrigerant without the operation of an electric heater.

In addition, under a cryogenic outside air condition in which it is difficult to use a heat pump system or a condition in which it is difficult to recover waste heat of the PE system or the battery, a mode (coefficient of performance (COP)=1) in which heat for interior heating is supplied by using compressor work may be performed (e.g. a Tesla Lossy mode is performed).

When the thermal management system is operated in the heating mode, for example, in the Tesla Lossy mode, the high-temperature refrigerant compressed by the compressor passes through the internal condenser and at the same time, the heating air passes around the internal condenser so that the air heated by the high-temperature refrigerant in the internal condenser is supplied to the vehicle interior.

As described above, while the high-temperature refrigerant and the heating air pass through the internal condenser, the heat of the refrigerant is transferred to the air as heat exchange may occur between the refrigerant and the air in the internal condenser, and the air heated by the heat exchange is supplied to the vehicle interior (interior heat-dissipation) to heat the interior without the operation of the electric heater.

However, in the conventional thermal management system that uses the compressor work in the heating mode as described above, the high-temperature and high-pressure refrigerant compressed by the compressor may be used as a heat source for supplying heat for interior heating instead of the electric heater (e.g., the PTC heater), but since it is not possible to supply the compressor work exceeding the COP=1 and both refrigerant and coolant should be used, heat loss may occur during heat transfer.

In other words, because a separate heat transfer medium such as coolant is required to supply additional heating heat during the heating mode, heat loss may occur during heat transfer, and a separate coolant circulation process is required to implement the mode.

In addition, the compressor work (=a load) is used to supply heat to the thermal management system during heating, but there is a limitation in that only a speed (RPM) of the compressor should be increased to secure sufficient heat through the compressor work, and as a result, there is a problem of the generation of compressor noise and shortened lifespan due to a high-speed operation. In addition, when the thermal management system uses only the compressor work for heating, there are disadvantages in that heating performance is limited due to a lack of a heating heat source, and it takes a lot of time to obtain sufficient heating heat.

In addition, the heat pump system widely used in electric vehicles uses outside air heat as a heating source to secure an all-electric range (AER) of the electric vehicle, and when the heat pump system is used, it is possible to reduce energy consumption, but the number of parts is increased, and thus there is a burden of the increased cost when the heat pump system is applied to compact vehicles.

SUMMARY

The present disclosure relates to a thermal management system for a vehicle, which may reduce costs while providing excellent cooling and heating performance.

An embodiment of the present disclosure can solve the problems described above and can be a thermal management system for a vehicle, which may reduce the cost as well as implementing excellent cooling and heating performance.

Problems solved by the present disclosure are not limited to the above-described. Other advantages that are not mentioned will be able to be clearly understood by those skilled in the art to which the present disclosure pertains (hereinafter referred to as "those skilled in the art") from the following description.

A thermal management system for a vehicle according to an embodiment of the present disclosure includes a compressor, a condenser, an expansion valve, and an evaporator, which are connected via refrigerant lines, and which are configured so that refrigerant passes and circulates therethrough. A first refrigerant line of the refrigerant lines extends between the compressor and the condenser, second refrigerant line extends between the expansion valve and the evaporator, and a third refrigerant line extends between and couples the evaporator to the compressor. A coolant circuit in includes a water pump, a chiller, a water heater, a heater core, and a battery coolant passage, which are connected via coolant lines, and which are configured so that coolant passes and circulates therethrough. A bypass line is installed to connect the first refrigerant line to the second refrigerant line. A branch line branched from the bypass line extends through the chiller and is coupled to the third refrigerant line. The branch line is configured for heat exchange between the refrigerant and the coolant in the chiller. A valve arrangement is configured to control a flow of the refrigerant so that the refrigerant circulating along the refrigerant lines flows by selectively passing through the bypass line, the branch line, and the chiller.

The valve arrangement may include a first valve installed at a position at which the bypass line is branched from the first refrigerant line between the compressor and the condenser, and a second valve installed at a position at which the bypass line is branched from the second refrigerant line between the expansion valve and the evaporator.

In addition, the thermal management system according to the embodiment of the present disclosure may further include a controller configured to control operations of the first valve and the second valve according to a set of thermal management modes. In response to the thermal management mode being an interior heating mode, the controller controls the first valve to close a first portion of the first refrigerant line at an inlet side of the condenser and to allow a second portion of the first refrigerant line at an outlet side of the compressor and the bypass line to communicate with each other so that refrigerant discharged from the compressor passes through the chiller via the bypass line and the branch line.

In addition, in the interior heating mode, the controller may control in response to the thermal management mode being in the interior heating mode. The controller further controls the second valve to close a first portion of the second refrigerant line at an outlet side of the expansion valve and to allow the bypass line and a second portion of the second refrigerant line at an inlet side of the evaporator to communicate with each other so that a portion of refrigerant passing through the bypass line circulates in the second portion of the second refrigerant line and passes through the evaporator.

In addition, in response to the thermal management mode being in the interior heating mode, the controller may be configured to operate the water pump so that the coolant circulates along the coolant lines of the coolant circuit, turn on the water heater to further heat the coolant heated by heat exchange with the refrigerant in the chiller, and allow air supplied by an air-conditioning blower to be heated by heat exchange with the coolant passing through the heater core and then discharged to a vehicle interior.

The refrigerant circuit may also include an accumulator installed in the third refrigerant line between the evaporator and the compressor and configured to perform gas-liquid separation. The branch line is connected to the accumulator from the chiller and configured so that after the refrigerant passes through the chiller, the refrigerant moves to the accumulator.

In addition, the thermal management system according to an embodiment of the present disclosure may further include a controller configured to control operations of the first valve and the second valve according to a set of thermal management modes. In response to the thermal management mode being an interior-cooling-battery-cooling mode in which interior cooling and battery cooling are performed simultaneously, the controller controls the first valve to close the bypass line and allows a first portion of the first refrigerant line at an inlet side of the condenser and a second portion of the first refrigerant line at an outlet side of the compressor to communicate with each other, and the controller controls the second valve to allow a first portion of the second refrigerant line at an outlet side of the expansion valve, a second portion of the second refrigerant line at an inlet side of the evaporator, and the bypass line to communicate with one another so that refrigerant discharged from the compressor is condensed in the condenser, expanded in the expansion valve, and then flows by being distributed to the evaporator for interior heating and the chiller via the branch line for battery cooling.

In addition, in response to the thermal management mode being the interior-cooling-battery-cooling mode in which interior cooling and battery cooling are performed simultaneously, the controller can operate the water pump to allow the coolant to pass through the chiller and the battery coolant passage when circulating along the coolant lines of the coolant circuit so that the coolant cooled by heat exchange with the refrigerant in the chiller cools a battery while passing through the battery coolant passage.

In addition, the thermal management system according to an embodiment of the present disclosure may further include a controller configured to control operations of the first valve and the second valve according to a set of thermal management modes, wherein in response to the thermal management mode being a battery cooling mode. The controller controls the first valve to close the bypass line and allow a first portion of the first refrigerant line at an inlet side of the condenser and a second portion of the first refrigerant line at an outlet side of the compressor to communicate with each other. The controller controls the second valve to close a second portion of the second refrigerant line at an inlet side of the evaporator and allow a first portion of the second refrigerant line at an outlet side of the expansion valve to communicate with the bypass line so that refrigerant discharged from the compressor is condensed in the condenser, expanded in the expansion valve, and then flows to the chiller via the branch line for battery cooling.

In addition, in response to the thermal management mode being the battery cooling mode, the controller operates the water pump to allow the coolant to pass through the chiller and the battery coolant passage when circulating along the coolant lines of the coolant circuit so that the coolant cooled by heat exchange with the refrigerant in the chiller cools a battery while passing A thermal management system for a vehicle according to an embodiment of the present disclosure includes a compressor, a condenser, an expansion valve, and an evaporator, which are connected via refrigerant lines, and which are configured so that refrigerant passes and circulates therethrough. A first refrigerant line of the refrigerant lines extends between the compressor and the condenser, second refrigerant line extends between the expansion valve and the evaporator, and a third refrigerant line extends between and couples the evaporator to the compressor. A coolant circuit in includes a water pump, a chiller, a water heater, a heater core, and a battery coolant passage, which are connected via coolant lines, and which are configured so that coolant passes and circulates therethrough. A bypass line is installed to connect the first refrigerant line to the second refrigerant line. A branch line branched from the bypass line extends through the chiller and is coupled to the third refrigerant line. The branch line is configured for heat exchange between the refrigerant and the coolant in the chiller. A valve arrangement is configured to control a flow of the refrigerant so that the refrigerant circulating along the refrigerant lines flows by selectively passing through the bypass line, the branch line, and the chiller. An air-conditioning blower is configured to supply air-conditioning air to the heater core and a cooling fan is configured to supply air to perform heat exchange with the refrigerant by the condenser.

In addition, the thermal management system according to an embodiment of the present disclosure may further include a radiator configured to perform heat-dissipation of the coolant through heat exchange with air. A first radiator coolant line of the coolant lines branched from an outlet side of the water pump is connected to an inlet side of the radiator so that the coolant circulated by the water pump is supplied to the radiator. A second radiator coolant line connected to an outlet side of the radiator is connected to an outlet side of the heater core of the coolant circuit.

In addition, the coolant circuit may further include a 3-way valve installed at a branching position at which the first radiator coolant line between the inlet side of the radiator and the outlet side of the water pump.

In addition, the refrigerant circuit may further include an accumulator installed in the third refrigerant line between the evaporator and the compressor and configured to perform gas-liquid separation. The branch line is connected to the accumulator from the chiller and configured so that after the refrigerant passes through the chiller, the refrigerant moves to the accumulator.

A thermal management system for a vehicle according to a further embodiment of the present disclosure includes a compressor, a condenser, an expansion valve, an evaporator, and an accumulator, which are connected via refrigerant lines, and which are configured so that refrigerant passes and circulates therethrough. A first refrigerant line of the refrigerant lines extends between the compressor and the condenser, second refrigerant line extends between the expansion valve and the evaporator, and a third refrigerant line extends between and couples the evaporator to the compressor. The accumulator is installed in the third refrigerant line between the evaporator and the compressor and configured to perform gas-liquid separation. A coolant circuit in includes a water pump, a chiller, a water heater, a heater core, and a battery coolant passage, which are connected via coolant lines, and which are configured so that coolant passes and circulates therethrough. A bypass line is installed to connect the first refrigerant line to the second refrigerant line. A branch line branched from the bypass line extends through the chiller and is coupled to the third refrigerant line. The branch line is configured for heat exchange between the refrigerant and the coolant in the chiller. The branch line is connected to the accumulator from the chiller and configured so that after the refrigerant passes through the chiller, the refrigerant moves to the accumulator. A valve arrangement is configured to control a flow of the refrigerant so that the refrigerant circulating along the refrigerant lines flows by selectively passing through the bypass line, the branch line, and the chiller. The valve arrangement includes a first valve installed at a position at which the bypass line is branched from the first refrigerant line between the compressor and the condenser, and a second valve installed at a position at which the bypass line is branched from the second refrigerant line between the expansion valve and the evaporator. A controller is configured to control operations of the first valve and the second valve according to a set of thermal management modes.

In addition, in response to the thermal management mode being an interior heating mode, the controller may control the first valve to close a first portion of the first refrigerant line at an inlet side of the condenser and to allow a second portion of the first refrigerant line at an outlet side of the compressor and the bypass line to communicate with each other so that refrigerant discharged from the compressor passes through the chiller via the bypass line and the branch line, and may further control the second valve to close a first portion of the second refrigerant line at an outlet side of the expansion valve and to allow the bypass line and a second portion of the second refrigerant line at an inlet side of the evaporator to communicate with each other so that a portion of refrigerant passing through the bypass line circulates in the second portion of the second refrigerant line and passes through the evaporator.

In addition, in response to the thermal management mode being an interior-cooling-battery-cooling mode in which interior cooling and battery cooling are performed simultaneously, the controller may control the first valve to close the bypass line and allow a first portion of the first refrigerant line at an inlet side of the condenser and a second portion of the first refrigerant line at an outlet side of the compressor to communicate with each other. The controller may control the second valve to allow a first portion of the second refrigerant line at an outlet side of the expansion valve, a second portion of the second refrigerant line at an inlet side of the evaporator, and the bypass line to communicate with one another so that refrigerant discharged from the compressor is condensed in the condenser, expanded in the expansion valve, and then flows by being distributed to the evaporator for interior heating and the chiller via the branch line for battery cooling. The controller may be further configured to operate the water pump to allow the coolant to pass through the chiller and the battery coolant passage when circulating along the coolant lines of the coolant circuit so that the coolant cooled by heat exchange with the refrigerant in the chiller cools a battery while passing through the battery coolant passage.

In addition, in response to the thermal management mode being a battery cooling mode, the controller can control the first valve to close the bypass line and allow a first portion of the first refrigerant line at an inlet side of the condenser and a second portion of the first refrigerant line at an outlet side of the compressor to communicate with each other. The controller can control the second valve to close a second portion of the second refrigerant line at an inlet side of the evaporator and allow a first portion of the second refrigerant line at an outlet side of the expansion valve to communicate with the bypass line so that refrigerant discharged from the compressor is condensed in the condenser, expanded in the expansion valve, and then flows to the chiller via the branch line for battery cooling. The controller is further configured to operate the water pump to allow the coolant to pass through the chiller and the battery coolant passage when circulating along the coolant lines of the coolant circuit so that the coolant cooled by heat exchange with the refrigerant in the chiller cools a battery while passing through the battery coolant passage.

According to an embodiment, the thermal management system may further include an air-conditioning blower configured to supply air-conditioning air to the heater core, a cooling fan configured to supply air to perform heat exchange with the refrigerant by the condenser, and a radiator configured to perform heat-dissipation of the coolant through heat exchange with air. A first radiator coolant line of the coolant lines branched from an outlet side of the water pump is connected to an inlet side of the radiator so that the coolant circulated by the water pump is supplied to the radiator, and a second radiator coolant line connected to an outlet side of the radiator is connected to an outlet side of the heater core of the coolant circuit.

Therefore, a thermal management system for a vehicle according to an embodiment of the present disclosure can be applied to secure price competitiveness of the electric vehicle and provided as an economical thermal management circuit capable of reducing the cost as well as implementing the excellent cooling and heating performance.

In particular, according to an embodiment of the present disclosure, it is possible to provide the thermal management system with the new configuration, which can perform various thermal management modes using the water heater and the compressor work (discharge refrigerant re-circulation) even without the heat pump or the PTC heater, which is the electric heater, to reduce costs and secure cooling and heating performance.

It can be understood that the term "automotive" or "vehicular" or other similar term as used herein can be inclusive of motor automotives in general such as passenger automobiles including sports utility automotives (operation SUV), buses, trucks, various commercial automotives, watercraft including a variety of boats and ships, aircraft, and the like, and can include hybrid automotives, electric automotives, plug-in hybrid electric automotives, hydrogen-powered automotives, and other alternative fuel automotives (e.g., fuels derived from resources other than petroleum). As referred to herein, a hybrid automotive can be an automotive that has two or more sources of power, for example both gasoline-powered and electric-powered automotives.

BRIEF DESCRIPTION OF THE DRAWINGS

The above and other features of the present disclosure will now be described in detail with reference to certain examples thereof illustrated in the accompanying drawings, which are given herein below by way of illustration only, and thus are not necessarily limitative of the present disclosure, and wherein.

It can be understood that the appended drawings are not necessarily drawn to scale, presenting a somewhat simplified representation of various features illustrative of embodiments and basic principles of the disclosure. The specific design features of an embodiment of the present disclosure as disclosed herein, including, for example, specific dimensions, orientations, locations, and shapes can be determined by a particular intended application and use environment.

In the figures, reference numbers can refer to the same or equivalent sections of the present disclosure throughout the several figures of the drawing.

DETAILED DESCRIPTION OF ILLUSTRATIVE EMBODIMENTS

Embodiments of the present disclosure will be described in detail with reference to the accompanying drawings. Specific structural or functional descriptions presented in the embodiments of the present disclosure are merely exemplified for the purpose of describing embodiments of the present disclosure, and the embodiments of the present disclosure may be implemented in other various forms. In addition, the disclosure should not necessarily be construed as being limited by the embodiments described in the specification, and it can be understood that the disclosure includes all modifications, equivalents, or substitutes included in the spirit and technical scope of the present disclosure.

In the present disclosure, terms such as "first" and/or "second" may be used to describe various components, but the components are not necessarily limited by the terms. The above terms can be used only for the purpose of distinguishing one component from another, for example, without departing from the scope of the present disclosure, and a first component may be referred to as a second component, and similarly, the second component may also be referred to as the first component.

When a certain component is described as being "connected" or "coupled" to another component, it can be understood that the certain component may be directly connected or coupled to another component or other components may also be included and located therebetween. On the other hand, when a certain component is described as being "directly connected" or "directly coupled" to another component, it can be understood that other components are not located therebetween. Other expressions for describing the relationship between components, such as "between" and "directly between" or "adjacent" and "directly adjacent" can be construed in a same or similar manner.

The same reference numbers can denote the same components throughout the specification. Terms used in the specification are for describing the embodiments and are not necessarily intended to limit the present disclosure. In the specification, the singular form can also include the plural form unless specifically stated in the phrase. As used herein, "comprises" and/or "comprising" means that the stated component, step, operation, and/or element do not preclude the presence of addition of one or more other components, steps, operations, and/or elements.

An embodiment of the present disclosure can provide a thermal management system capable of reducing the cost as well as implementing excellent cooling and heating performance and can relate to a thermal management system with a configuration of a cooling/heating secondary loop circuit using re-circulation heat of refrigerant discharged from a compressor and an economical circuit.

Figure 1:
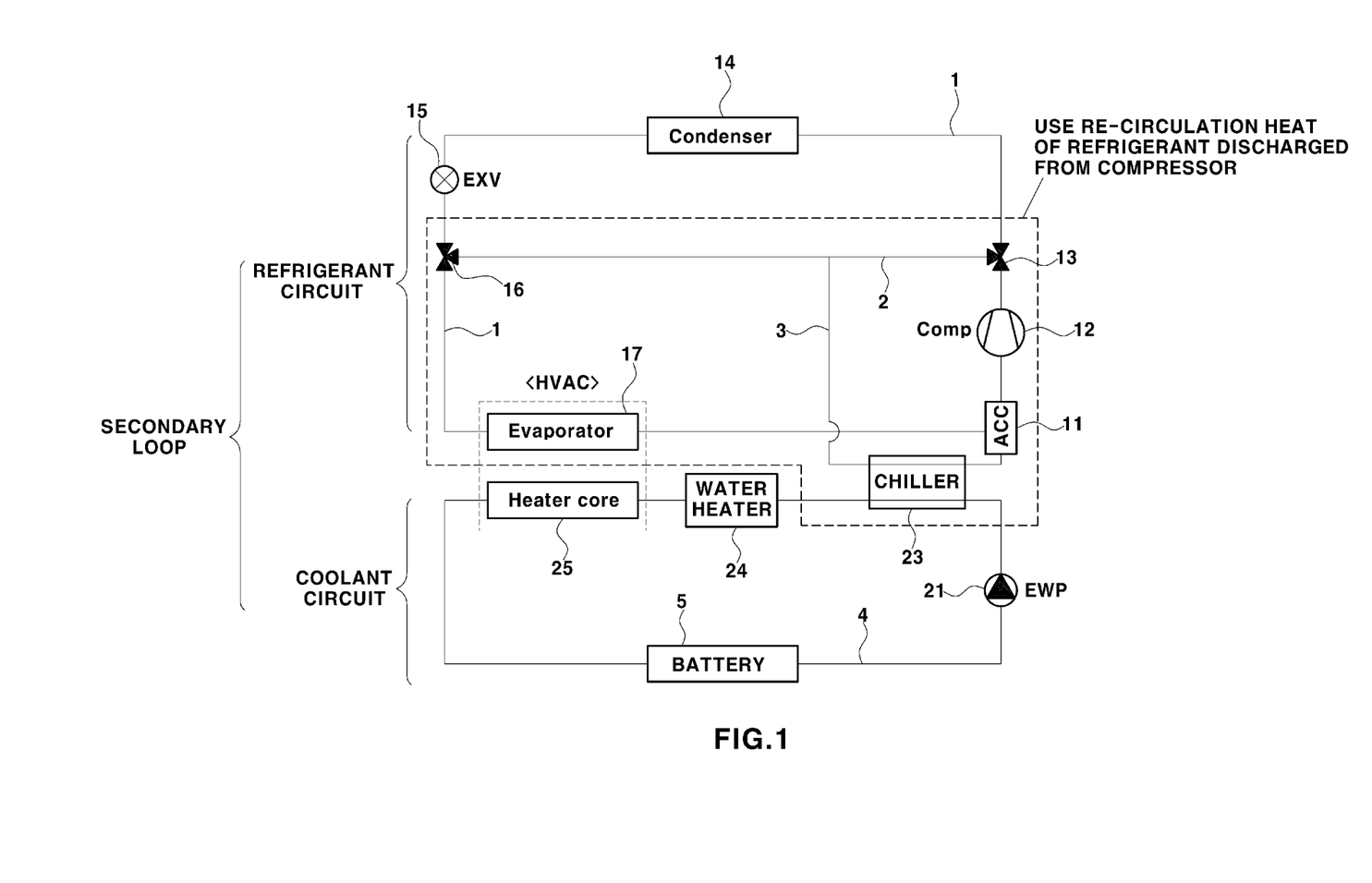
FIG. 1 is a view illustrating a configuration of a thermal management system according to an embodiment of the present disclosure.
Figure 2:
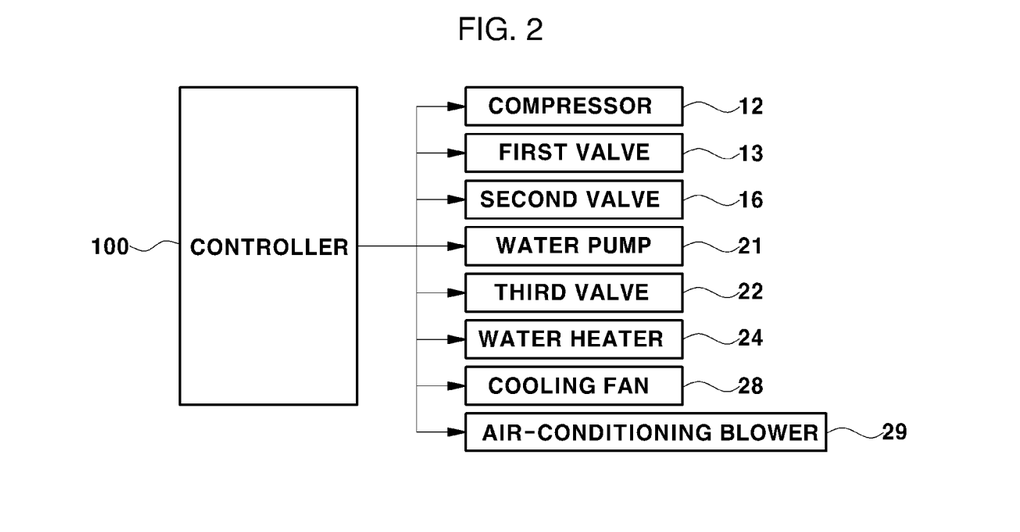
FIG. 2 is a block diagram illustrating a controller and operation units in the thermal management system according to an embodiment of the present disclosure.

FIG. 1 is a view illustrating a configuration of a thermal management system according to an embodiment of the present disclosure. FIG. 2 is a block diagram illustrating a controller and operation units in a thermal management system according to an embodiment of the present disclosure.

FIG. 1 illustrates a configuration of a cooling/heating secondary loop circuit including two cooling circuits in which an individual cooling fluid circulates, such as a refrigerant circuit in which air-conditioning refrigerant circulates and a coolant circuit in which coolant circulates.

In an embodiment, a refrigerant circuit is a major component of an air-conditioning system and includes a compressor 12 for compressing and transferring refrigerant at a high-temperature and high-pressure state, a condenser 14 for condensing the refrigerant compressed by the compressor 12 through heat exchange with air, an expansion valve 15 for expanding the refrigerant vaporized by being condensed by the condenser 14 in a low-temperature and low-pressure state, and an evaporator 17 for cooling air using the latent heat of evaporation of the refrigerant while evaporating the refrigerant expanded by the expansion valve 15.

The components of the air-conditioning system of FIG. 1 are connected through a refrigerant line 1 through which the refrigerant flows, and while circulating along the refrigerant line 1, and the refrigerant sequentially passes through the components of the air-conditioning system.

In addition, the refrigerant circuit of an embodiment further includes an accumulator 11 in which the gas-liquid separation of the refrigerant is performed. The accumulator 11 can be installed in the refrigerant line 1 at a position before a front end of the compressor 12 based on a path through which the refrigerant circulates, that is, in the refrigerant line 1 between the evaporator 17 and the compressor 12 and can function to allow only the refrigerant in a gas state to be supplied to the compressor 12, thereby improving the efficiency and durability of the compressor.

In addition, the refrigerant circuit can further include a bypass line 2, which is a refrigerant line installed by being branched from the refrigerant line 1 so that the refrigerant may selectively pass through the condenser 14 and the expansion valve 15 and a branch line 3, which is a refrigerant line branched from the bypass line 2 and connected to a chiller 23 of the coolant circuit.

The bypass line 2 can be a refrigerant line connecting a position of a rear end of the expansion valve 15 and a position of a rear end of the condenser 14 in the refrigerant line 1, which is a refrigerant line connecting the refrigerant line 1, which is a position at an outlet side of the compressor and a position of an inlet side of the condenser, to the refrigerant line 1, which is a position at an inlet side of the evaporator 17 and a position at an outlet side of the expansion valve 15.

In addition, the refrigerant circuit may further include a valve device for controlling a flow of the refrigerant so that the refrigerant circulating along the refrigerant line 1 may flow by selectively passing through the bypass line 2, the branch line 3, and the chiller 23 of the coolant circuit.

As the valve device, 3-way valves 13 and 16 for controlling a flow direction of the refrigerant may be installed at each position at which the bypass line 2 is branched from the refrigerant line 1, and each of the 3-way valves 13 and 16 may be electronic valves whose opening states are controlled according to a control signal output from the controller 100 (see FIG. 2).

In the following description, the 3-way valve 13 installed at a branch position at which the bypass line 2 is branched from the refrigerant line 1 between the compressor 12 and the condenser 14 will be referred to as "first valve." In addition, the 3-way valve 16 installed at a branch position at which the bypass line 2 is branched from the refrigerant line 1 between the expansion valve 15 and the evaporator 17 will be referred to as "second valve."

The branch line 3 can be branched from the bypass line 2, which is the outlet side of the compressor 12, and connected to pass through the chiller 23, and the refrigerant distributed from the bypass line 2 can be supplied to the chiller 23 and then perform heat exchange with the coolant while passing through the chiller 23.

The branch line 3 may be connected to an inlet of the chiller 23, and the branch line 3 connected to the outlet of the chiller 23 may be connected to the accumulator 11. Therefore, the gaseous refrigerant compressed in the high-temperature and high-pressure by the compressor 12 may move to the bypass line 2, then move from the bypass line 2 to the branch line 3, may be supplied to the chiller 23 of the coolant circuit, and supplied from the chiller 23 back to the accumulator 11.

As described above, the branch line 3 can be connected to the inlet and the outlet of the chiller 23, and when the refrigerant distributed from the bypass line 2 is supplied to the chiller 23 through the branch line 3, heat exchange between the refrigerant and coolant passing through the chiller 23 can be performed. The branch line 3 connected to the outlet of the chiller 23 may be connected to an inlet of the accumulator 11, and thus the refrigerant passing through the chiller 23 may flow to the accumulator 11 for gas-liquid separation.

The coolant circuit can include a battery temperature control system for cooling and heating the battery 5, and specifically, can include a water pump 21 for pumping and pressure-feeding the coolant, the chiller 23 for cooling the battery 5, a water heater 24 for heating the battery 5, a heater core 25 for heating air-conditioning air through the heat exchange between the coolant and the air, and a battery coolant passage (not illustrated) provided in the battery 5 so that the coolant may pass therethrough.

The components of the battery temperature control system can be connected through a coolant line 4 so that the coolant may circulate, and the water pump 21, the chiller 23, the water heater 24, and the heater core 25 are located sequentially along the coolant circulation path. Therefore, while the coolant circulates along the coolant line 4, the coolant may sequentially pass through the water pump 21, the chiller 23, the water heater 24, and the heater core 25.

The water pump 21 may be an electric water pump (EWP) driven by an electric motor. The branch line 3 and the coolant line 4 can be connected to the chiller 23, and heat exchange can be performed between the refrigerant flowing from the chiller 23 along the branch line 3 and the coolant circulating along the coolant line 4.

The chiller 23 can cool the coolant passing through the battery 5 to cool the battery and can receive low-temperature refrigerant through the branch line 3 so that heat exchange is performed between the low-temperature refrigerant and the coolant.

On the other hand, the water heater 24 can heat the coolant passing through the battery 5 to heat the battery, and the coolant heated by the water heater 24 can pass through the battery 5 via the heater core 25.

The heater core 25 can include a heating, ventilation, and air conditioning system (HVAC) together with components of the air-conditioning system and the water heater 24 and can be provided to allow heat exchange to be performed between the coolant passing through the inside and the air passing therearound.

The air supplied to the heater core 25 can be supplied by an air-conditioning blower (reference numeral "29" in FIG. 2) and can pass through the heater core 25 while the air blown by the air-conditioning blower 29 moves along an air-conditioning case.

Heat can be dissipated from the high-temperature coolant passing through the heater core 25 to the air-conditioning air to heat the vehicle interior, and the air-conditioning air heated through the heat exchange with the coolant while passing through the heater core 25 can be discharged to the vehicle interior to perform heating.

Figure 3:
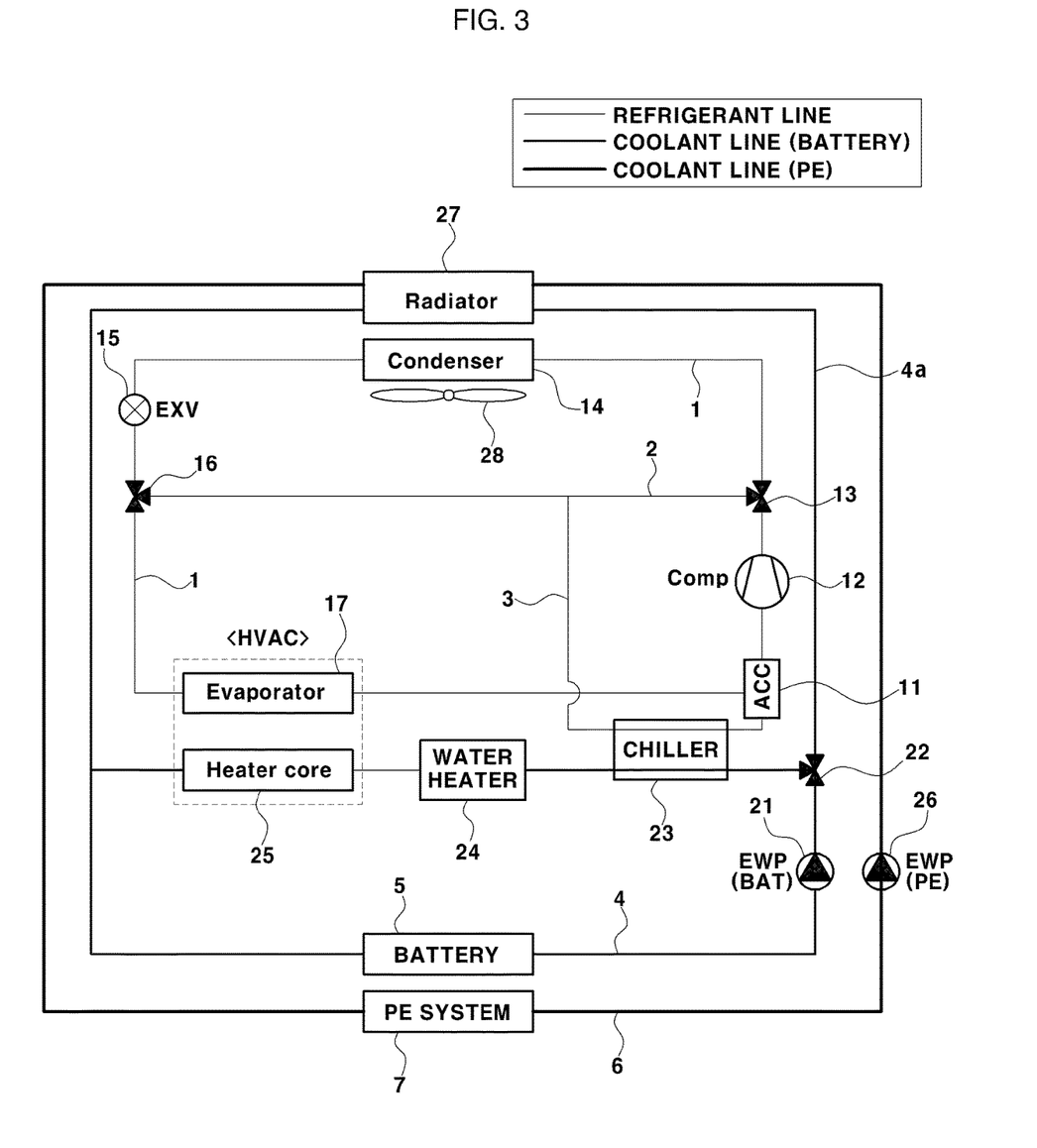
FIG. 3 is a view illustrating an overall configuration of a thermal management system according to an embodiment of the present disclosure.

FIG. 3 is a view illustrating an overall configuration of a thermal management system according to an embodiment of the present disclosure and further illustrates a power electronics (PE) temperature control system for performing the thermal management for the PE system.

As illustrated, the thermal management system according to an embodiment of the present disclosure further includes the PE temperature control system, and the PE temperature control system performs a function for cooling devices or components of the PE system 7. The PE temperature control system can use a water cooled cooling method like the battery cooling method of the battery temperature control system.

The PE temperature control system may include a separate water pump 26 for pumping and pressure-feeding coolant, a radiator 27 for heat-dissipation of the coolant, and a separate coolant line 6 connected to the PE system 7 so that the coolant may circulate between the water pump 26 and the radiator 27.

The water pump 26 may be an EWP driven by the electric motor. The radiator 27 can constitute a cooling module of the vehicle together with the condenser 14 of the air-conditioning system and a cooling fan 28, and the cooling module may be located on a front end portion of the vehicle so that outside air may be introduced and may pass.

In the embodiment of the present disclosure, devices or components of the PE system 7, which are cooling targets of the PE temperature control system, may include an inverter and a motor mounted in the electric vehicle, and specifically, may include a front wheel motor, a rear wheel motor, a front wheel inverter for driving and controlling the front wheel motor, and a rear wheel inverter for driving and controlling the rear wheel motor, for example. The front wheel motor can be a motor connected to a front wheel of the vehicle to transmit power to drive the front wheel, and the rear wheel motor can be a motor connected to a rear wheel of the vehicle to transmit power to drive the rear wheel.

In addition, in the battery temperature control system, a separate coolant line 4a can be branched from the coolant line 4 at an outlet side of the water pump 21 and connected to an inlet side of the radiator 27. In addition, the outlet side of the radiator 27 can be connected to the coolant line 4 at an inlet side of the heater core 25 through the branched coolant line 4a so that the coolant passing through the radiator 27 may flow back to the battery temperature control system.

In addition, as the 3-way valve for controlling a flow direction of the coolant, a third valve 22 may be installed at a branching position at which the coolant line 4a connected to the radiator 27 is branched from the coolant line 4 at the outlet side of the water pump 21.

The third valve 22 may also be an electronic valve whose opening state is controlled according to a control signal output from the controller 100 (see FIG. 2). The third valve 22 can control the flow direction of the coolant pressure-fed by the water pump 21 so that the coolant passing through the battery 5 may selectively pass through the radiator 27.

In addition, a flow rate of the coolant flowing through the radiator 27 and a flow rate of the coolant flowing through the chiller 23, the water heater 24, and the heater core 25 may be controlled depending on the opening state of the third valve 22, and the coolant may bypass the radiator 27 and flow only through the chiller 23, the water heater 24, and the heater core 25.

Therefore, the coolant line 4 in which the chiller 23, the water heater 24, and the heater core 25 are installed can function as a kind of bypass line that allows the coolant to flow by bypassing the radiator 27 depending on the opening state of the third valve 22.

As described above, the configuration of the thermal management system according to an embodiment of the present disclosure has been described, and the above-described thermal management system may be provided as an economical thermal management circuit capable of reducing the cost as well as implementing cooling and heating performance.

In particular, according to an embodiment of the present disclosure, there may be provided a thermal management system with a new configuration, which can secure heating performance even without the heat pump or the PTC heater, which is an electric heater, in order to reduce the cost.

Hereinafter, an operating state of the thermal management system according to an embodiment of the present disclosure will be described. The thermal management system according to an embodiment of the present disclosure may perform various thermal management modes using the water heater and the compressor work (discharge refrigerant re-circulation) even without the heat pump or the PTC heater.

A thermal management system according to an embodiment of the present disclosure may perform a mode for cooling the PE system 7, a mode for cooling the battery 5, a cooling and battery heating simultaneous mode for simultaneously performing the cooling the vehicle interior and the cooling the battery 5, a mode for heating the battery 5, a heating and battery heating simultaneous mode for simultaneously performing the heating of the vehicle interior and the heating of the battery 5, a heating and dehumidifying simultaneous mode for simultaneously performing the heating and dehumidification of the vehicle interior, and the like.

In a thermal management system of an embodiment of the present disclosure, the controller 100 is provided to control operations of the operating units illustrated in FIG. 2, such as the first valve 13 and the second valve 16, depending on the thermal management modes set as described above. For example, operations of the first valve 13 and the second valve 16 may be controlled to allow the refrigerant circulating along the refrigerant line 1 to flow by selectively passing through the bypass line 2, the branch line 3, and the chiller 23.

Figure 4:
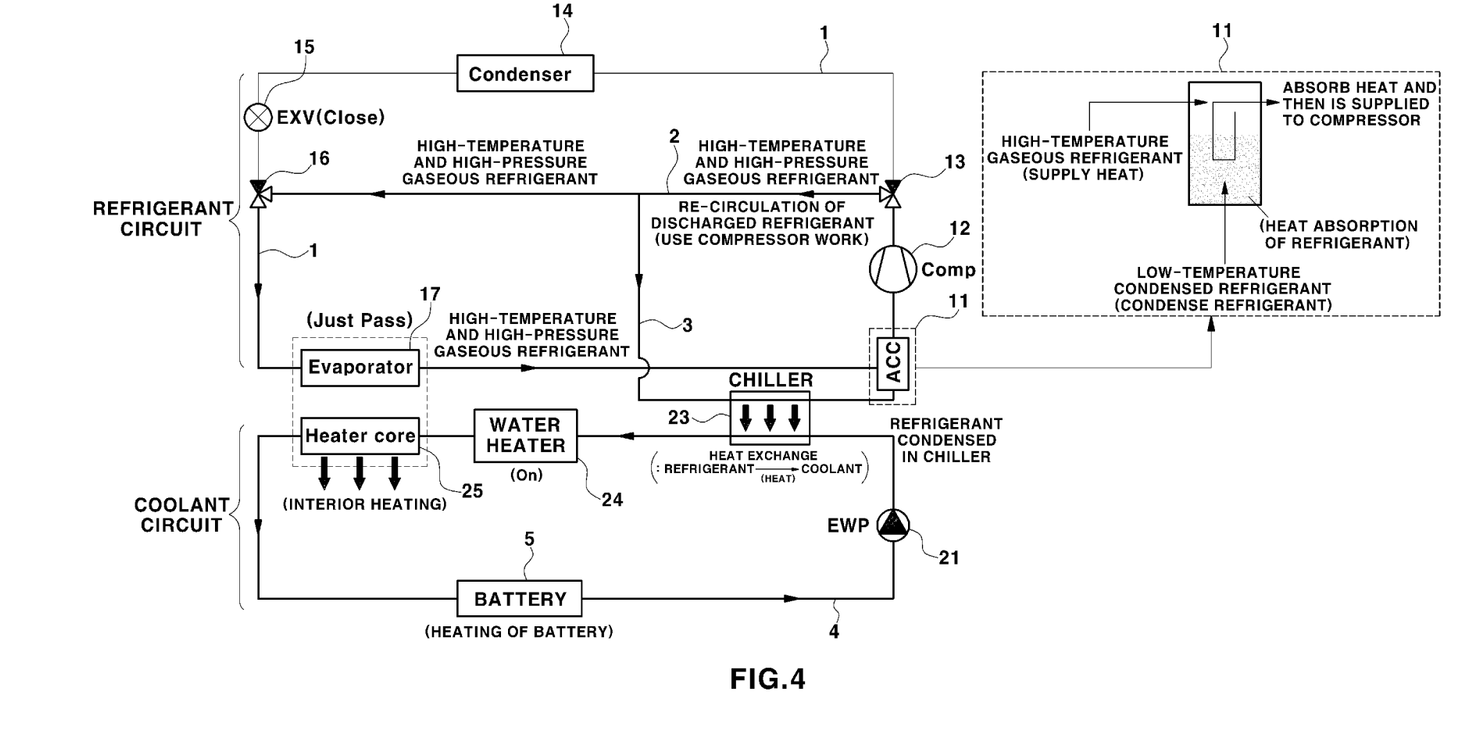
FIG. 4 is a view for describing an operating state in a heating mode of a thermal management system according to an embodiment of the present disclosure.

FIG. 4 is a view for describing an operating state in a heating mode of the thermal management system according to an embodiment of the present disclosure. In an embodiment, to heat the vehicle interior, the compressor 12 is driven, and the water heater 24 is controlled in an ON state by the controller 100 to be operated to heat coolant.

In addition, the controller 100 can operate the water pump 21 of the coolant circuit, can operate the air-conditioning blower (reference numeral "29" in FIG. 2) for heating, and can allow the air blown by the air-conditioning blower 29 to pass around the heater core 25 and then be discharged to the vehicle interior.

In addition, an opening state of the first valve 13 can be controlled so that the refrigerant discharged from the compressor 12 may flow through the bypass line 2 and the branch line 3 without passing through the condenser 14, and an opening state of the second valve 16 can be controlled so that some refrigerant may pass through the evaporator 17 by the controller 100.

Specifically, the first valve 13 can be controlled to allow the entire amount of refrigerant discharged from the compressor 12 to flow through the bypass line 2 and can be controlled to close the refrigerant line at the inlet side of the condenser 14, and can allow the refrigerant line at the outlet side of the compressor 12 and the bypass line 2 to communicate with each other.

In addition, the second valve 16 can be controlled to allow the refrigerant flowing through the bypass line 2 to flow to the evaporator 17 and can be controlled to close the refrigerant line at the outlet side of the expansion valve 15, and can allow the bypass line 2 and the refrigerant line 1 at the inlet side of the evaporator 17 to communicate with each other.

At an initial operation of the vehicle in winter, it may be necessary to heat the battery 5, and to this end, the water heater 24 of the battery temperature control system can be used as a heat source. Therefore, it can be difficult to sufficiently supply the heat necessary for heating the vehicle interior using only the water heater 24 without the heat pump.

Therefore, to secure a heating heat source, heat required for heating can be supplemented by using the compressor work without adopting an additional component, and in this case, by allowing a portion of the high-temperature gaseous refrigerant discharged from the compressor 12 to the chiller 23 installed in the coolant line 4 of the secondary loop, that is, the chiller 23 of the coolant circuit, an additional heating heat source can be provided by a method of transferring the heat of the refrigerant discharged from the compressor.

As the heat exchange between the refrigerant and the coolant occurs in the chiller 23, the heat of the refrigerant can be transferred to the coolant, and the coolant receiving the heat of the refrigerant from the chiller 23 can be further heated in the water heater 24 and then can perform heat exchange with the air-conditioning air in the heater core 25.

As a result, the air-conditioning air receiving the heat of the coolant while passing through the heater core 25 can be discharged to the vehicle interior to supply the heat required for the heating to the vehicle. The low-temperature refrigerant condensed during heat exchange with the coolant in the chiller 23 can be then sent to the accumulator 11.

In addition, the coolant receiving the heat from the refrigerant in the chiller 23 can be additionally heated in the water heater 24 and then partially used as the heating heat source in the heater core 25, and the remainder can be used to heat the battery 5, and therefore, the battery 5 may be sufficiently heated at the initial beginning of the vehicle, and then, when the system is stabilized, it is possible to achieve stable heating through the water heater 24.

At the same time, the remaining high-temperature gaseous refrigerant discharged from the compressor 12 and then bypassed without passing through the chiller 23 can move from the bypass line 2 to the refrigerant line 1, can pass through the evaporator 17, and then can be supplied to the accumulator 11, and the high-temperature gaseous refrigerant can move directly to the accumulator 11 without heat exchange in the evaporator 17 to supply the heat to the inside of the accumulator, and the high-temperature gaseous refrigerant can be used as the heat source for heat-absorption and vaporization of the low-temperature condensed refrigerant stored in the accumulator 11.

In other words, in the accumulator 11, the heat-absorption of the refrigerant receiving the heat of the refrigerant passing through the evaporator 17 without the heat exchange after discharged from the compressor 12 can be performed on the low-temperature condensed refrigerant stored after passing through the chiller 23, and thus the liquid refrigerant stored in the accumulator 11 may absorb the heat, then be converted into gaseous refrigerant, and supplied back to the compressor 12.

Therefore, because the high-temperature gaseous refrigerant discharged from the compressor may be used as the heat source for heating in winter and heating the battery and at the same time, used as the heat source for heat absorption and vaporization of the refrigerant in the accumulator, it is possible to secure a flow rate of the refrigerant capable of circulating at low temperatures in winter, and as a result, it is possible to continuously supply the heat source in the vehicle even without a separate component through the compressor work.

Figure 5:
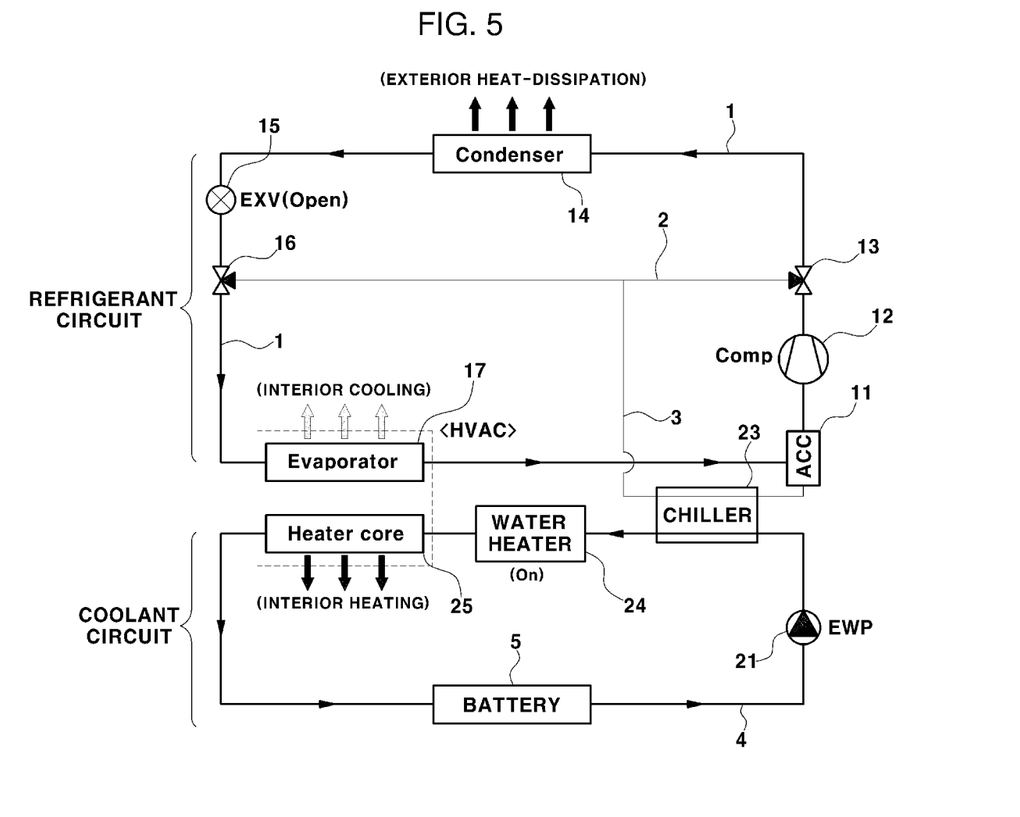
FIG. 5 is a view for describing an operating state in which a thermal management system according to an embodiment of the present disclosure performs interior heating and dehumidification at the same time.

Next, FIG. 5 is a view for describing an operating state in which the thermal management system according to an embodiment of the present disclosure simultaneously performs heating and dehumidification, and the heating and dehumidifying simultaneous mode as illustrated in FIG. 5 may be performed when a situation in which dehumidification due to an increase in interior humidity is desired/required when the heating mode in winter is operated.

In the heating and dehumidifying simultaneous mode, the coolant circuit can be used to supply the heat for interior heating, and the refrigerant circuit can be used to control (dehumidify) interior humidity for air-conditioning.

In the heating and dehumidifying simultaneous mode, the water heater 24 can be operated, and the compressor 12 and the water pump 21 can be operated by the controller 100. In addition, the cooling fan (reference numeral "28" in FIGS. 2 and 3) and the air-conditioning blower (reference numeral "29" in FIG. 2) can be operated, and the operations of the first valve 13 and the second valve 16 for controlling the flow direction of the refrigerant can be controlled.

At this time, the operations of the first valve 13 and the second valve 16 can be controlled so that the high-temperature gaseous refrigerant compressed by the compressor 12 does not flow through the bypass line 2 and the branch line 3, may sequentially pass through the condenser 14, the expansion valve 15, and the evaporator 17, and then flow to the accumulator 11.

In other words, the first valve 13 can be controlled to allow the entire amount of refrigerant discharged from the compressor 12 to flow to the condenser 14 and can be controlled to close the bypass line 2, and can allow the refrigerant line at the outlet side of the compressor 12 and the refrigerant line at the inlet side of the condenser 14 to communicate with each other.

In addition, the second valve 16 can be controlled to allow the entire amount of refrigerant discharged from the expansion valve 15 to flow to the evaporator 17, can be controlled to close the bypass line 2, and can allow the refrigerant line at the outlet side of the expansion valve 15 and the refrigerant line at the inlet side of the evaporator 17 to communicate with each other. Therefore, in such configuration, the refrigerant does not flow to the bypass line 2, the branch line 3, and the chiller 23.

When the system is stabilized after the initial operation of the vehicle, in the coolant circuit, the coolant can receive heat from the water heater 24 and the battery 5, and in the heater core 25, the coolant can supply heat for interior heating through heat exchange with air.

As described above, while the interior heating can be performed, the interior humidity of the vehicle can vary depending on an interior inside air use rate, and interior dehumidification can be required over time. In this case, the high-temperature and high-pressure gaseous refrigerant discharged from the compressor 12 can release heat to the outside air while passing through the condenser 14 and then is expanded while passing through the expansion valve 15 and supplied to the evaporator 17 in the low-temperature and low-pressure state.

As described above, while the evaporator 17 is operated, heat exchange can be performed between the low-temperature and low-pressure refrigerant passing through the expansion valve 15 and the air, and thus the cold air required for dehumidification may be supplied to the vehicle interior. Therefore, it is possible to control the humidity of the heating air supplied to the interior from the HVAC system, thereby securing interior comfort by removing moisture (fog).

Figure 6:
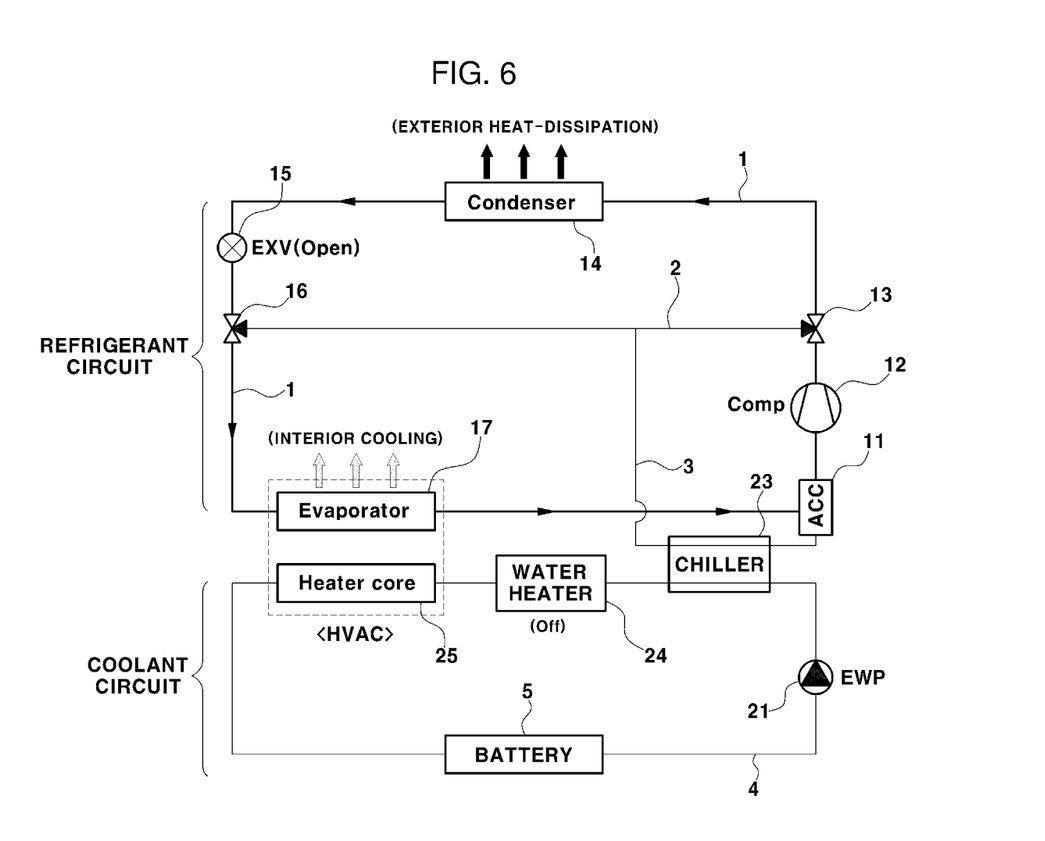
FIG. 6 is a view for describing an operating state in a cooling mode of a thermal management system according to an embodiment of the present disclosure.
Figure 7:
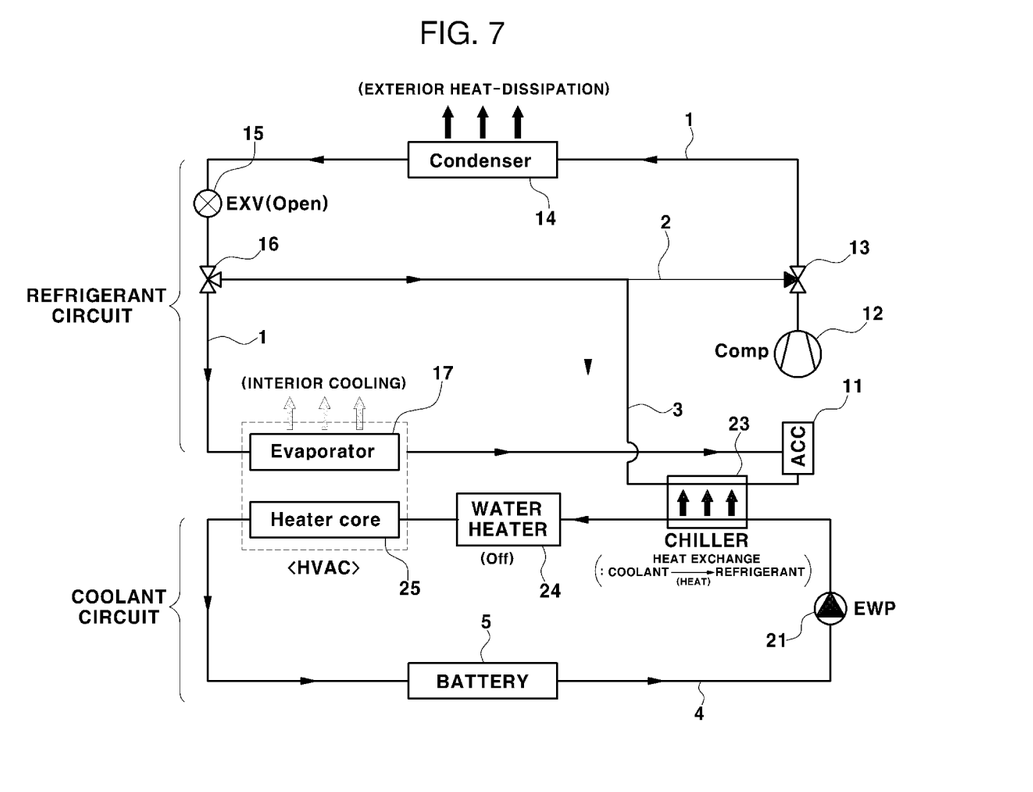
FIG. 7 is a view for describing an operating state in which a thermal management system according to an embodiment of the present disclosure performs interior cooling and battery cooling at the same time.

Next, FIG. 6 is a view for describing an operating state in a cooling mode of the thermal management system according to an embodiment of the present disclosure, and FIG. 7 is a view for describing an operating state in which the thermal management system according to an embodiment of the present disclosure performs interior cooling and battery cooling at the same time.

The cooling mode of FIG. 6 is a general cooling mode in which the vehicle interior is cooled by using the air-conditioning system when interior cooling is required in the summer, and the water heater 24 is maintained in an OFF state, the compressor 12, the cooling fan (reference numeral "28" in FIGS. 2 and 3), and the air-conditioning blower (reference numeral "29" in FIG. 2) are operated, and the operations of the first valve 13 and the second valve 16 for controlling the flow direction of the refrigerant are controlled by the controller 100.

In this mode, the first valve 13 can be controlled to allow the entire amount of refrigerant discharged from the compressor 12 to flow to the condenser 14 and can be controlled to close the bypass line 2 and allow the refrigerant line at the outlet side of the compressor 12 and the refrigerant line at the inlet side of the condenser 14 to communicate with each other.

In addition, the second valve 16 can be controlled to allow the entire amount of refrigerant discharged from the expansion valve 15 to flow to the evaporator 17 and can be controlled to close the bypass line 2 and allow the refrigerant line at the outlet side of the expansion valve 15 and the refrigerant line at the inlet side of the evaporator 17 to communicate with each other.

Therefore, the high-temperature and high-pressure gaseous refrigerant discharged from the compressor 12 can flow to the condenser 14 through the first valve 13, and the refrigerant heat-dissipated and condensed through the heat exchange with the outside air in the condenser 14 can flow to the expansion valve 15.

The refrigerant can be expanded while passing through the expansion valve 15 and become a low-temperature and low-pressure state, then supplied to the evaporator 17 through the second valve 16, and then exchange heat with the air-conditioning air in the evaporator 17.

Therefore, the air-conditioning air cooled by the low-temperature refrigerant in the evaporator 17 can be discharged to the vehicle interior to perform interior cooling.

The refrigerant passing through the evaporator 17 moves back to the accumulator 11 for gas-liquid separation and is then stored.

In the cooling and battery cooling simultaneous mode in FIG. 7, the water heater 24 is maintained in an OFF state, the compressor 12, the water pump 21, the cooling fan (reference numeral "28" in FIGS. 2 and 3), and the air-conditioning blower (reference numeral "29" in FIG. 2) are operated, and the operations of the first valve 13 and the second valve 16 for controlling the flow direction of the refrigerant are controlled by the controller 100.

In this mode, the first valve 13 can be controlled to allow the entire amount of refrigerant discharged from the compressor 12 to flow to the condenser 14 and can be controlled to close the bypass line 2 and allow the refrigerant line at the outlet side of the compressor 12 and the refrigerant line at the inlet side of the condenser 14 to communicate with each other.

In addition, the second valve 16 can control the low-temperature and low-pressure refrigerant expanded in the expansion valve 15 after condensed in the condenser 14 to flow to the bypass line 2 and flow by being distributed on both sides of the evaporator 17 and can control all of the refrigerant line at the outlet side of the expansion valve 15 and the refrigerant line at the inlet side of the evaporator 17, and the bypass line 2 to communicate with one another.

As described above, the second valve 16 controls all of the bypass line 2 and both sides of the refrigerant line at the inlet side of the evaporator 17 to be opened so that a portion of the refrigerant passing through the expansion valve 15 may be distributed to the chiller 23 through the bypass line 2 and the branch line 3 when the cooling of the battery 5 is required upon cooling.

Therefore, as in the general cooling mode in FIG. 6, in the mode of FIG. 7, the air-conditioning system is operated, and at the same time, the low-temperature refrigerant distributed to the chiller 23 through the bypass line 2 and the branch line 3 in the second valve 16 performs heat exchange with the coolant passing through the chiller 23.

In the coolant circuit of the battery temperature control system, the coolant can circulate along the coolant line 4 by the water pump 21, and the coolant cooled by the refrigerant in the chiller 23 cools the battery 5 while passing through the battery 5 coolant passage.

Figure 8:
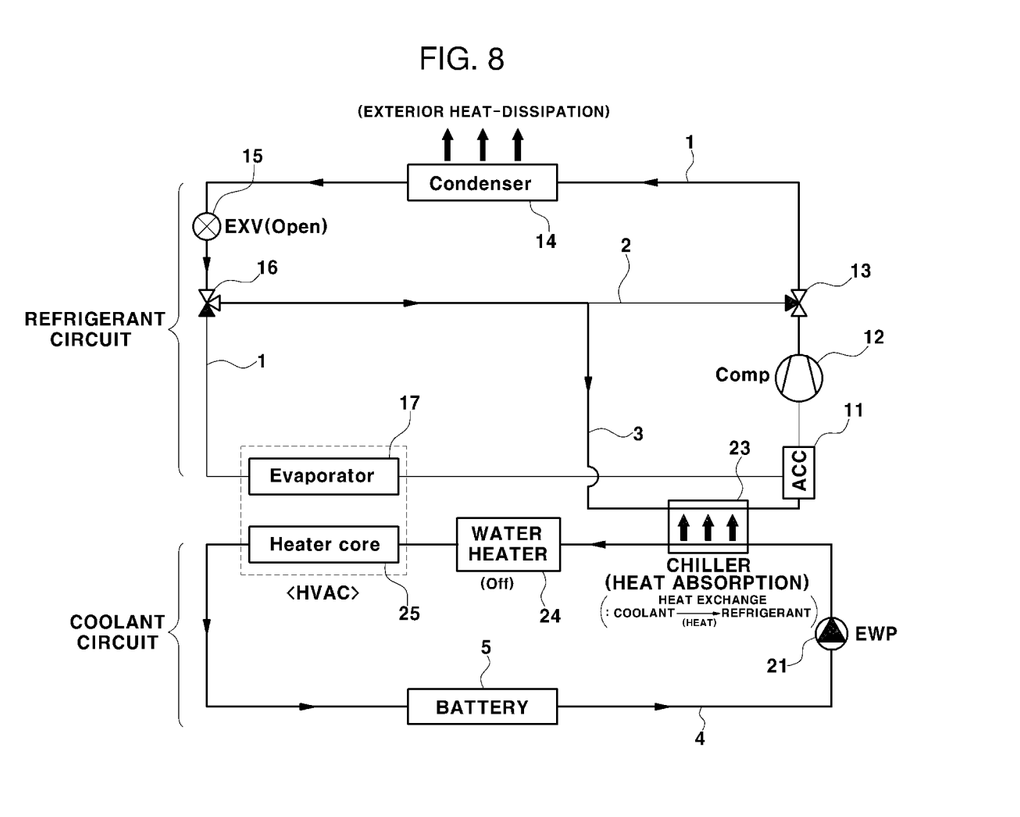
FIG. 8 is a view for describing an operating state in a battery cooling mode of a thermal management system according to an embodiment of the present disclosure.

FIG. 8 is a view for describing an operating state in the battery cooling mode of the thermal management system according to an embodiment of the present disclosure, and the battery cooling mode is a mode in which only the battery cooling is performed by using the secondary loop when the battery cooling is required in a situation in which a load of the battery 5 is high, and a mode in which the battery cooling is performed by using the air-conditioning system in order to preferentially remove the heat of the battery 5.

In the battery cooling mode of FIG. 8, the coolant circuit can be used to cool the battery by removing the heat of the battery 5, and the refrigerant circuit can be used to absorb the heat of the battery 5 using refrigerant. The coolant circuit can discharge the heat absorbed from the battery 5 through the coolant in the coolant circuit, which can be discharged to the atmosphere through the condenser 14 through the refrigerant.

In the battery cooling mode of FIG. 8, the water heater 24 is maintained in an OFF state, the compressor 12, the water pump 21, and the cooling fan (reference numeral "28" in FIGS. 2 and 3) are operated, and the operations of the first valve 13 and the second valve 16 for controlling the flow direction of the refrigerant are controlled by the controller 100.

In this mode, the first valve 13 can control the entire amount of refrigerant discharged from the compressor 12 to flow to the condenser 14, can control the bypass line 2 to be closed, and can control the refrigerant line at the outlet side of the compressor 12 and the refrigerant line at the inlet side of the condenser 14 to communicate with each other.

In addition, the second valve 16 can be controlled to allow the entire amount of low-temperature and low-pressure refrigerant expanded in the expansion valve 15 after being condensed in the condenser 14 to flow through the bypass line 2 and can be controlled to close the refrigerant line at the inlet side of the evaporator 17 and allow the refrigerant line at the outlet side of the expansion valve 15 and the bypass line 2 to communicate with each other.

Therefore, the high-temperature and high-pressure gaseous refrigerant discharged from the compressor 12 can flow to the condenser 14 after passing through the first valve 13 and can be heat-dissipated and condensed through heat exchange with air (outside air) in the condenser 14. In addition, the refrigerant condensed in the condenser 14 can be expanded in the low-temperature and low-pressure state while passing through the expansion valve 15 and then supplied to the chiller 23 along the bypass line 2 and the branch line 3 through the second valve 16, and the refrigerant can perform heat exchange with the coolant passing through the chiller in the chiller 23.

As a result, the coolant cooled by the refrigerant in the chiller 23 can cool the battery 5 while passing through the battery 5 coolant passage, and in this mode, the heat generated from the battery 5 can be finally discharged to the outside of the vehicle through the outside air from the condenser 14 (exterior heat-dissipation).

Although the embodiments of the present disclosure have been described above in detail, the scope of the present disclosure is not necessarily limited thereto, and various modifications and improvements by those skilled in the art using the basic concepts of the present disclosure, as defined in the appended claims, can be also included in the scope of the present disclosure.

What is claimed is:

1. A thermal management system for a vehicle, comprising:
   a refrigerant circuit comprising a compressor, a condenser, an expansion valve, and an evaporator, which are connected via refrigerant lines, and which are configured so that refrigerant passes and circulates therethrough, wherein a first refrigerant line of the refrigerant lines extends between the compressor and the condenser, wherein a second refrigerant line extends between the expansion valve and the evaporator, and wherein a third refrigerant line extends between and couples the evaporator to the compressor;
   a coolant circuit comprising a water pump, a chiller, a water heater, a heater core, and a battery coolant passage, which are connected via coolant lines, and which are configured so that coolant passes and circulates therethrough;
   a bypass line installed to connect the first refrigerant line to the second refrigerant line;
   a branch line branched from the bypass line, extending through the chiller, and coupled to the third refrigerant line, the branch line being configured for heat exchange between the refrigerant and the coolant in the chiller; and
   a valve arrangement configured to control a flow of the refrigerant so that the refrigerant circulating along the refrigerant lines flows by selectively passing through the bypass line, the branch line, and the chiller.

2. The thermal management system of claim 1, wherein the valve arrangement comprises a first valve installed at a position at which the bypass line is branched from the first refrigerant line between the compressor and the condenser, and a second valve installed at a position at which the bypass line is branched from the second refrigerant line between the expansion valve and the evaporator.

3. The system of claim 2, further comprising a controller configured to control operations of the first valve and the second valve according to a set of thermal management modes,
   wherein in response to the thermal management mode being an interior heating mode, the controller is configured to control the first valve to close a first portion of the first refrigerant line at an inlet side of the condenser and to allow a second portion of the first refrigerant line at an outlet side of the compressor and the bypass line to communicate with each other so that refrigerant discharged from the compressor passes through the chiller via the bypass line and the branch line.

4. The system of claim 3, wherein in response to the thermal management mode being in the interior heating mode, the controller is further configured to control the second valve to close a first portion of the second refrigerant line at an outlet side of the expansion valve and to allow the bypass line and a second portion of the second refrigerant line at an inlet side of the evaporator to communicate with each other so that a portion of refrigerant passing through the bypass line circulates in the second portion of the second refrigerant line and passes through the evaporator.

5. The system of claim 3, wherein in response to the thermal management mode being in the interior heating mode, the controller is further configured to:
   operate the water pump so that the coolant circulates along the coolant lines of the coolant circuit;
   turn on the water heater to further heat the coolant heated by heat exchange with the refrigerant in the chiller; and
   allow air supplied by an air-conditioning blower to be heated by heat exchange with the coolant passing through the heater core and then discharged to a vehicle interior.

6. The system of claim 5, wherein the refrigerant circuit further comprises an accumulator installed in the third refrigerant line between the evaporator and the compressor and configured to perform gas-liquid separation, and
   wherein the branch line is connected to the accumulator from the chiller and configured so that after the refrigerant passes through the chiller, the refrigerant moves to the accumulator.

7. The system of claim 2, further comprising a controller configured to control operations of the first valve and the second valve according to a set of thermal management modes,
   wherein in response to the thermal management mode being an interior-cooling-battery-cooling mode in which interior cooling and battery cooling are performed simultaneously, the controller is configured to control the first valve to close the bypass line and allow a first portion of the first refrigerant line at an inlet side of the condenser and a second portion of the first refrigerant line at an outlet side of the compressor to communicate with each other, and the controller is configured to control the second valve to allow a first portion of the second refrigerant line at an outlet side of the expansion valve, a second portion of the second refrigerant line at an inlet side of the evaporator, and the bypass line to communicate with one another so that refrigerant discharged from the compressor is condensed in the condenser, expanded in the expansion valve, and then flows by being distributed to the evaporator for interior heating and the chiller via the branch line for battery cooling.

8. The system of claim 7, wherein in response to the thermal management mode being the interior-cooling-battery-cooling mode in which interior cooling and battery cooling are performed simultaneously, the controller is configured to operate the water pump to allow the coolant to pass through the chiller and the battery coolant passage when circulating along the coolant lines of the coolant circuit so that the coolant cooled by heat exchange with the refrigerant in the chiller cools a battery while passing through the battery coolant passage.

9. The system of claim 2, further comprising a controller configured to control operations of the first valve and the second valve according to a set of thermal management modes, wherein in response to the thermal management mode being a battery cooling mode,
the controller is configured to control the first valve to close the bypass line and allow a first portion of the first refrigerant line at an inlet side of the condenser and a second portion of the first refrigerant line at an outlet side of the compressor to communicate with each other, and
the controller is configured to control the second valve to close a second portion of the second refrigerant line at an inlet side of the evaporator and allow a first portion of the second refrigerant line at an outlet side of the expansion valve to communicate with the bypass line so that refrigerant discharged from the compressor is condensed in the condenser, expanded in the expansion valve, and then flows to the chiller via the branch line for battery cooling.

10. The system of claim 9, wherein in response to the thermal management mode being the battery cooling mode, the controller is configured to operate the water pump to allow the coolant to pass through the chiller and the battery coolant passage when circulating along the coolant lines of the coolant circuit so that the coolant cooled by heat exchange with the refrigerant in the chiller cools a battery while passing through the battery coolant passage.

11. A thermal management system for a vehicle, comprising:
a refrigerant circuit comprising a compressor, a condenser, an expansion valve, and an evaporator, which are connected via refrigerant lines, and which are configured so that refrigerant passes and circulates therethrough, wherein a first refrigerant line of the refrigerant lines extends between the compressor and the condenser, wherein a second refrigerant line extends between the expansion valve and the evaporator, and wherein a third refrigerant line extends between and couples the evaporator to the compressor;
a coolant circuit comprising a water pump, a chiller, a water heater, a heater core, and a battery coolant passage, which are connected via coolant lines, and which are configured so that coolant passes and circulates therethrough;
a bypass line installed to connect the first refrigerant line to the second refrigerant line;
a branch line branched from the bypass line, extending through the chiller, and coupled to the third refrigerant line, the branch line being configured for heat exchange between the refrigerant and the coolant in the chiller;
a valve arrangement configured to control a flow of the refrigerant so that the refrigerant circulating along the refrigerant lines flows by selectively passing through the bypass line, the branch line, and the chiller;
an air-conditioning blower configured to supply air-conditioning air to the heater core; and
a cooling fan configured to supply air to perform heat exchange with the refrigerant by the condenser.

12. The system of claim 11, further comprising a radiator configured to perform heat-dissipation of the coolant through heat exchange with air, wherein a first radiator coolant line of the coolant lines branched from an outlet side of the water pump is connected to an inlet side of the radiator so that the coolant circulated by the water pump is supplied to the radiator, and
a second radiator coolant line connected to an outlet side of the radiator is connected to an outlet side of the heat core of the coolant circuit.

13. The system of claim 12, wherein the coolant circuit further comprises a 3-way valve installed at a branching position at which the first radiator coolant line is between the inlet side of the radiator and the outlet side of the water pump.

14. The system of claim 11, wherein the refrigerant circuit further comprises an accumulator installed in the third refrigerant line between the evaporator and the compressor and configured to perform gas-liquid separation, and
wherein the branch line is connected to the accumulator from the chiller and configured so that after the refrigerant passes through the chiller, the refrigerant moves to the accumulator.

15. A thermal management system for a vehicle, comprising:
a refrigerant circuit comprising a compressor, a condenser, an expansion valve, an evaporator, and an accumulator, which are connected via refrigerant lines, and which are configured so that refrigerant passes and circulates therethrough, wherein a first refrigerant line of the refrigerant lines extends between the compressor and the condenser, wherein a second refrigerant line extends between the expansion valve and the evaporator, and wherein a third refrigerant line extends between and couples the evaporator to the compressor, wherein the accumulator is installed in the third refrigerant line between the evaporator and the compressor and configured to perform gas-liquid separation;
a coolant circuit comprising a water pump, a chiller, a water heater, a heater core, and a battery coolant passage, which are connected via coolant lines, and which are configured so that coolant passes and circulates therethrough;
a bypass line installed to connect the first refrigerant line to the second refrigerant line;
a branch line branched from the bypass line, extending through the chiller, and coupled to the third refrigerant line, the branch line being configured for heat exchange between the refrigerant and the coolant in the chiller, wherein the branch line is connected to the accumulator from the chiller and configured so that after the refrigerant passes through the chiller, the refrigerant moves to the accumulator;
a valve arrangement configured to control a flow of the refrigerant so that the refrigerant circulating along the refrigerant lines flows by selectively passing through the bypass line, the branch line, and the chiller, wherein the valve arrangement comprises a first valve installed at a position at which the bypass line is branched from the first refrigerant line between the compressor and the condenser, and a second valve installed at a position at which the bypass line is branched from the second refrigerant line between the expansion valve and the evaporator; and a controller configured to control operations of the first valve and the second valve according to a set of thermal management modes.

16. The system of claim 15, wherein in response to the thermal management mode being an interior heating mode, the controller is configured to control the first valve to close a first portion of the first refrigerant line at an inlet side of the condenser and to allow a second portion of the first refrigerant line at an outlet side of the compressor and the bypass line to communicate with each other so that refrigerant discharged from the compressor passes through the chiller via the bypass line and the branch line, and the controller is further configured to control the second valve to close a first portion of the second refrigerant line at an outlet side of the expansion valve and to allow the bypass line and a second portion of the second refrigerant line at an inlet side of the evaporator to communicate with each other so that a portion of refrigerant passing through the bypass line circulates in the second portion of the second refrigerant line and passes through the evaporator.

17. The system of claim 15, wherein in response to the thermal management mode being an interior-cooling-battery-cooling mode in which interior cooling and battery cooling are performed simultaneously, the controller is configured to control the first valve to close the bypass line and allow a first portion of the first refrigerant line at an inlet side of the condenser and a second portion of the first refrigerant line at an outlet side of the compressor to communicate with each other, the controller is configured to control the second valve to allow a first portion of the second refrigerant line at an outlet side of the expansion valve, a second portion of the second refrigerant line at an inlet side of the evaporator, and the bypass line to communicate with one another so that refrigerant discharged from the compressor is condensed in the condenser, expanded in the expansion valve, and then flows by being distributed to the evaporator for interior heating and the chiller via the branch line for battery cooling, and the controller is further configured to operate the water pump to allow the coolant to pass through the chiller and the battery coolant passage when circulating along the coolant lines of the coolant circuit so that the coolant cooled by heat exchange with the refrigerant in the chiller cools a battery while passing through the battery coolant passage.

18. The system of claim 17, wherein in response to the thermal management mode being a battery cooling mode, the controller is configured to control the first valve to close the bypass line and allow a first portion of the first refrigerant line at an inlet side of the condenser and a second portion of the first refrigerant line at an outlet side of the compressor to communicate with each other, the controller is configured to control the second valve to close a second portion of the second refrigerant line at an inlet side of the evaporator and allow a first portion of the second refrigerant line at an outlet side of the expansion valve to communicate with the bypass line so that refrigerant discharged from the compressor is condensed in the condenser, expanded in the expansion valve, and then flows to the chiller via the branch line for battery cooling, and the controller is further configured to operate the water pump to allow the coolant to pass through the chiller and the battery coolant passage when circulating along the coolant lines of the coolant circuit so that the coolant cooled by heat exchange with the refrigerant in the chiller cools a battery while passing through the battery coolant passage.

19. The system of claim 15, further comprising:

an air-conditioning blower configured to supply air-conditioning air to the heater core;

a cooling fan configured to supply air to perform heat exchange with the refrigerant by the condenser; and a radiator configured to perform heat-dissipation of the coolant through heat exchange with air, wherein a first radiator coolant line of the coolant lines branched from an outlet side of the water pump is connected to an inlet side of the radiator so that the coolant circulated by the water pump is supplied to the radiator, and a second radiator coolant line connected to an outlet side of the radiator is connected to an outlet side of the heat core of the coolant circuit.

* * * * *